United States Patent
Wadhwa et al.

(10) Patent No.: US 11,314,785 B2
(45) Date of Patent: Apr. 26, 2022

(54) AUTOMATIC VISUALIZATION AND INQUIRY GENERATION

(71) Applicant: International Business Machines Corporation, Armonk, NY (US)

(72) Inventors: Vinay Wadhwa, Ottawa (CA); Graham Wills, Naperville, IL (US); Valentin Balteanu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/732,952

(22) Filed: Jan. 2, 2020

(65) Prior Publication Data

US 2021/0209135 A1 Jul. 8, 2021

(51) Int. Cl.
*G06F 16/28* (2019.01)
*G06F 17/15* (2006.01)
*G06F 40/20* (2020.01)
*G06F 16/242* (2019.01)

(52) U.S. Cl.
CPC .......... *G06F 16/287* (2019.01); *G06F 16/244* (2019.01); *G06F 17/15* (2013.01); *G06F 40/20* (2020.01)

(58) Field of Classification Search
CPC ...... G06F 16/244; G06F 16/287; G06F 17/15; G06F 40/20
See application file for complete search history.

(56) References Cited

U.S. PATENT DOCUMENTS

| | | | |
|---|---|---|---|
| 9,098,810 B1 | 8/2015 | Sengupta et al. | |
| 2007/0276820 A1* | 11/2007 | Iqbal | G06F 16/248 |
| 2012/0124478 A1* | 5/2012 | King | G06F 16/90 |
| | | | 715/738 |
| 2015/0317573 A1 | 11/2015 | Petitclerc et al. | |
| 2016/0371288 A1 | 12/2016 | Le Biannic et al. | |
| 2016/0371395 A1* | 12/2016 | Dumant | G06F 16/24575 |
| 2017/0243112 A1* | 8/2017 | Ekambaram | G06N 3/0454 |
| 2018/0052884 A1* | 2/2018 | Kale | G06F 16/24578 |
| 2018/0121500 A1* | 5/2018 | Reschke | G06F 40/30 |
| 2019/0205391 A1* | 7/2019 | Dobrynin | G06F 9/454 |
| 2021/0157826 A1* | 5/2021 | Wang | G06F 16/287 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.
Srinivasan et al., "Augmenting Visualizations wtih Interactive Data Facts to Facilitate Interpretation and Communication," Georgia Institute of Technology, https://arjun010.github.io/static/papers/voder-infovis18.pdf, accessed Jun. 20, 2019, 10 pgs.

* cited by examiner

*Primary Examiner* — Matthew J Ellis
(74) *Attorney, Agent, or Firm* — Jared L. Montanaro (57) ABSTRACT

A processor may receive information from a user. The information may include one or more datums. The processor may analyze the information for one or more correlations between the one or more datums. The processor may translate each correlation into a word group. Each word group may be associated with an icon. The processor may rank each word group based on a predictive importance. The processor may generate a set of visualizations based on the ranked word groups. The ranked word groups may each be associated with contextual metadata that enables generation of predictive actions.

17 Claims, 8 Drawing Sheets

AUTOMATIC VISUALIZATION AND INQUIRY GENERATION

BACKGROUND

The present disclosure relates generally to the field of information analysis, and more specifically to automatically generating visualizations and inquiries associated with analyzed information.

Oftentimes, when trying to explore data, users are frequently at a loss as to where to begin analysis of the data. Consequently, users commonly probe the wrong inquiries to be solved, get lost in analysis of large datasets, or try to confirm a hypothesis based on a biased opinion.

SUMMARY

Embodiments of the present disclosure include a method, computer program product, and system for generating a set of visualizations. A processor may receive information from a user. The information may include one or more datums. The processor may analyze the information for one or more correlations between the one or more datums. The processor may translate each correlation into a word group. Each word group may be associated with an icon. The processor may rank each word group based on a predictive importance. The processor may generate a set of visualizations based on the ranked word groups. The ranked word groups may each be associated with contextual metadata that enables generation of predictive actions.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of information analysis, and more specifically to automatically generating visualizations and inquiries associated with analyzed information. While the present disclosure is not necessarily limited to such applications, various aspects of the disclosure may be appreciated through a discussion of various examples using this context.

Oftentimes, when trying to explore data, users are frequently at a loss as to where to begin analysis of the data. Consequently, users commonly probe the wrong inquiries to be solved, get lost in analysis of large datasets, or try to confirm a hypothesis based on a biased opinion. Further, many business intelligence applications only present users with a summary page that includes a number of visualizations that seeming help make sense of the analyzed data. However, users still have to process the summary and the visualizations by fine-tuning the visualizations. Therefore, it may be beneficial to have a way to do statistical/predictive analysis on the data, infer possible focal points and present the possible focal points in a concise visualization. Discussed below in regard to this disclosure is a method that may help users frame/trigger questions to explore that can be answered by the data (e.g., help lead a user to previously unknown correlations and/or associations).

In some embodiments, a processor may receive information from a user. The information may include one or more datums (e.g., words, pictures, recordings, graphs, tables, etc.). The processor may analyze the information for one or more correlations between the one or more datums. The processor may translate each correlation into a word group. Each word group may be associated with an icon. The processor may rank each word group based on a predictive importance. The processor may generate a set of visualizations based on the ranked word groups. The ranked word groups may each be associated with contextual metadata that enables generation of predictive actions.

For example, a music practitioner may input a dataset associated with musical compositions into a computer system. The computer system may parse the musical compositions into multiple components, e.g., based on pitch, rhythm, chorus, refrain, etc. The computer system may then identify that the majority of musical compositions follow a pattern of a chorus into a refrain. The computer system may identify this as a predictive correlation that may need further investigation by the user. The computer system may then generate a word visualization, such as, chorus (forwarding arrow) refrain, which indicates to a user that a chorus usually precedes a refrain.

In another example, a researcher may input data associated with a student learning study into a computer system. The computer system may parse the data into individual words and identify correlations between the parsed words, such as, kinematic=movement, mathematics=formulas, etc. The computer system may then group the correlated words together into a word group and add an icon to visually represent an association with the word group, e.g., the kinematic word group includes movement, fidgeting, etc. and is depicted by a downward line, that indicates a correlated loss in retention for students if a student is associated with kinematic. Further, the mathematics word group includes formulas, algebra, etc. and is depicted by an upward line that indicates a correlated increase in retention for students if a student is associated with mathematics.

The computer system may then rank the word groups based on which correlation is predicted to be the hardest correlation to find. That is, it may be known that students who do well in math have good retention, however, it may not be known that students who are kinematic learners may retain information better when studying in their own house versus a library. Therefore, the kinematic word group may have the most unexpected correlation and be prioritized/ranked above the mathematics word group.

In some embodiments, the set of visualizations generated by the processor may be a word cloud. The word cloud may include a display of each of the word groups. The display of each of the word groups may include a user interactive link to a respective predictive action embedded in each of the displayed word groups.

For example, following the example above, to help the research identify the kinematic correlation, the computer system may generate a word diagram with each of the word groups and have the kinematic word group be the most prominent word group (e.g., depicted as the physically largest type-print) in the diagram. A user may be able to click on the word group, and the computer system may then show the user a list of actions and/or questions that can be had in association with the word group, e.g., the research may click on the kinematic word group and the computer system may show the researcher a list of automated questions that can be searched by the researcher (e.g., where do kinematic learners learn the best) or the computer system may automatically tell the researcher that kinematic learners are predicted to learn best while studying at home.

In some embodiments, the processor may identify that the user has selected a specific user interactive link that is associated with specific contextual metadata. The processor may generate a set of predictive actions associated with the specific contextual metadata. The processor may display the set of predictive actions to the user. For example, a user may be researching honey bees and a word cloud may be generated that has three word groups: geography, weather, and travel. The user may click on the travel word group and a list of predictive actions may be displayed that state: how far can honey bees travel, do honey bees travel from one species of flower or stay with a preferred one, etc.

In some embodiments, the set of predictive actions may include inquiry metadata that enables generation of an inquiry. The processor may identify that the user has selected a specific inquiry metadata. The processor may generate an inquiry associated with the inquiry metadata. The processor may display the inquiry to the user. For example, following the example above, the user may then click on "how far can honey bees travel," and then be displayed further predictive actions, such as: honey bees are presumed to be able to travel 2 miles from their hive, or honey bees are predicted to travel north of their hive (perhaps an unknown correlation not known by the user).

In some embodiments, translating each correlation into the respective word groups may include the processor interpreting, based on natural language processing techniques, a context of each of the one or more datums. The processor may combine each of the one or more datums within a context threshold into one or more of the respective word groups. The processor may tag each of the respective word groups with an indication of the context. The indication may be the icon.

For example, a computer may be input with information associated with a food survey. The computer system may identify that the words cookie, soft, chewy, and salty are found. The computer may then identify that cookies are usually described as soft and/or chewy and determine that the words are within a correlation threshold, e.g., of 80% as they are usually seen with one another. However, salty may not be a common association, but nonetheless the computer may identify from a corpus of previously identified food associations that salted cookies do exist and therefore the correlation threshold may be met and recorded for the user to be notified about.

In some embodiments, ranking each word group based on the predictive importance may include determining a degree of relevance for each word group. The degree of relevance may be based on an ease of defining each correlation (e.g., the number of insights needed to determine the correlation with the least amount of insights indicating a lower degree of relevance and vice-versa). Following the example above, since cookies are usually described as soft and/or chewy and not as salty, the computer may rank the correlation/association of cookies as salty above the correlation/association of cookies being soft and/or chewy as it is of more relevance for the user to know as it is not as intuitive for the user to have known.

In some embodiments, determining the degree of relevance for each word group may include accessing a database. The database may include historic information that indicates previously identified correlations between the one or more datums. The processor may identify that a specific correlation is not in the database. The processor may rank the word group associated with the specific correlation above the other word groups. In some embodiments, the processor may rank the specific correlation above the other word groups because the specific correlation is newly discovered and not known and/or the specific correlation is non-obvious to users analyzing the data (e.g., only the computer was able to find the insight from the analyzed information).

Figure 1:
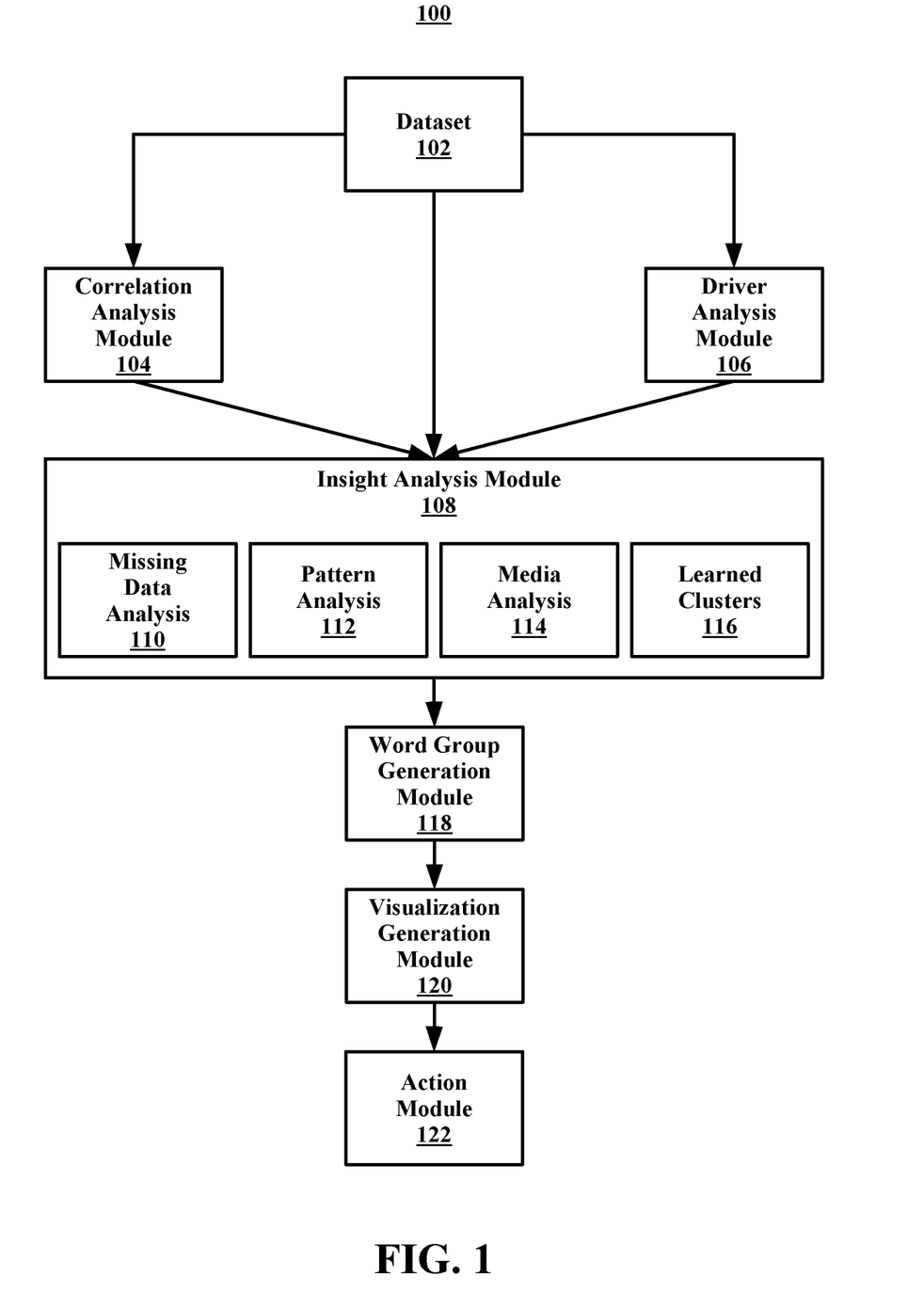
FIG. 1 illustrates an example system for automatically generating a proposed action based on a dataset, in accordance with embodiments of the present disclosure.

Referring now to FIG. 1, illustrated is an example system 100 for automatically generating a proposed action based on a dataset 102 (e.g., information), in accordance with embodiments of the present disclosure. In some embodiments, the system 100 includes the dataset 102, a correlation analysis module 104, a driver analysis module 106, an insight analysis module 108, a word-group generation module 118, a visualization generation module 120, and an action module 122. In some embodiments, the insight analysis module 108 is able to perform the functions of: missing data analysis 110 where data not provided in the dataset 102 is inferred, pattern analysis 112 where a pattern associated with the dataset 102 is identified, media analysis 114 where media (e.g., music, videos, etc.) are analyzed and/or determined to be associated with the dataset 102, and utilizing learned clusters 116 where prior correlations and/or datasets are used to evaluate the dataset 102. It is noted that other analysis processes besides those displayed by the missing data analysis 110, pattern analysis 112, media analysis 114, and utilizing learned clusters 116, may be used.

In some embodiments, a user loads the dataset 102 into the system 100 and/or to software on the system 100. The system 100 pushes the dataset 102 to the correlation analysis module 104 that identifies and/or determines correlations between metadata found in the dataset 102, the driver analysis module 106 that identifies and/or determines probable causes of the dataset 102, and the insight analysis module that uses metadata and various statistical/predictive analysis methods, such as those performed by the insight analysis module 108 (e.g., missing data analysis 110, pattern analysis 112, media analysis 114, and utilizing learned clusters 116). In some embodiments, the correlations found in the correlation analysis module 104 and the probable causes of the driver analysis module 106 are simultaneously pushed to the insight analysis module with the dataset 102.

In some embodiments, the insight analysis module 108, can perform other sub-processes besides those already discussed (e.g., missing data analysis 110, pattern analysis 112, media analysis 114, and learned clusters 116). The sub-processes may include, but are not limited to: checking the shape/dispersion of the dataset 102 (e.g., Is data skewed?, Which nominal field values are more popular?, etc.), determining if the dataset 102 is based in time (e.g., Are there any fields that vary a lot over time?), determining if there are any entities detected in the dataset 102 (e.g., What are the top n trending conversation clusters related to entities?), determining the top n interesting measures (e.g., Are there any clusters that can be learnt?, Are there any bins inferred from cluster groups?, What are the top n most frequent nominal values for related fields, etc.).

In some embodiments, after analysis of the dataset 102 by the analysis module 104, the driver analysis module 106, and the insight analysis module 108, the insight analysis module pushes the analyses/outputs to the word group generation module 118 that generates groups of words that are determined to be likely associated (e.g., bread may be associated to cookies because of baking, etc.). After generating one or more word groups, the visualization generation module 120 generates a hybrid word cloud visualization where each word/word group represents a correlation/prediction that is worth exploring further. It is noted that word groups may include icons to reflect inferred condition, e.g., trends.

In some embodiments, the size of the word/word group displayed in the hybrid word cloud visualization is based on a relevance scale (e.g., how easy/difficult the word/word group was to identify/determine based on an identified correlation, how many insights needed to identify correlation, etc.). In some embodiments, a user can expand each word/word-group and the action module 122 will generate/display connected questions/actions (e.g., perform sampling of group x for further insight, etc.) that are answered by the data. In some embodiments, the action module 122 generates a new visualization based on the word/word group the user selects. In some embodiments, the user may alter the predicted question/action provided by the action module 122, which can lead to a user-specific experience. For example, the action module 122 may suggest a statistical analysis of dataset x, but the user may ask the system 100 to perform statistical analysis of dataset y. It is noted that the actions/functions discussed above can be repeated as many times as desired by the user.

Figure 2:
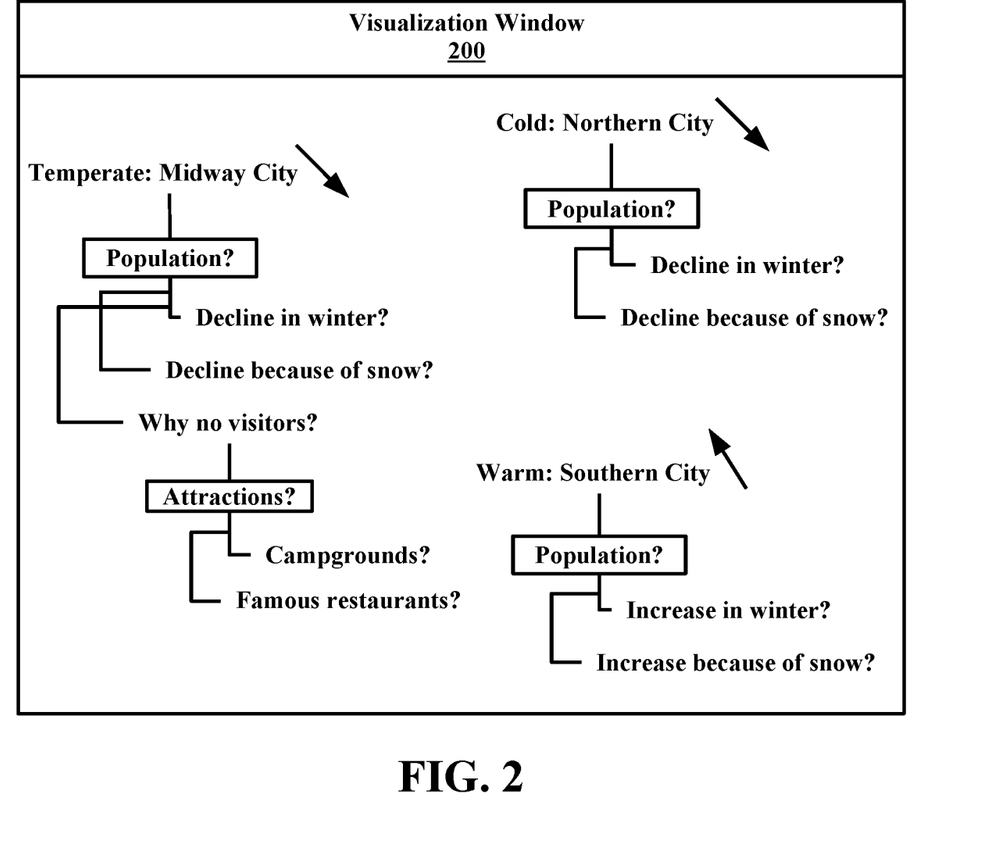
FIG. 2 illustrates an example visualization window, in accordance with embodiments of the present disclosure.

Referring now to FIG. 2, illustrated is an example visualization window 200, in accordance with embodiments of the present disclosure. In some embodiments, the visualization window 200 displays and/or is the hybrid word cloud visualization of FIG. 1. As depicted, the visualization window 200 includes a word group visualization that includes associated icons (e.g., the arrows). It is noted that any icon, not just arrows, could be used, e.g., emojis, trend graphs, etc. It is further noted that the visualization could be any visualization, such as, but not limited to a heat map, etc.

The word groups are Cold: Northern City with a declining arrow icon, Warm: Southern City with an inclining arrow icon, and Temperate: Midway City with a declining arrow icon. The word groups may have been generated based on an inputted dataset that deals with tourism during winter in the Midway City, which is the midway point between the Northern City and the Southern City. The user may identify from the icons that the Northern City and the Midway city have a decline in population during winter months and that the Southern City has an increase in population.

The user may interact with the word groups and select "Midway City," and the visualization window 200 will then provide the prompt question: "Population?" which then chains to further questions that the user may desire to understand, for instance, "Why are there no visitors (in winter)?" The user may be interested in this question as the Midway City is the midway point between the Northern City and the Southern City, and the user may desire to capture winter travelers who are headed to or from either the Northern City or the Southern City. The user may then click on the "Why no visitors?" question and further see from the visualization window 200 that there may be no campgrounds or famous restaurants in the Midway City, which could lead to more visitors. The user may then be able to report said information to the Midway City and help increase the number of winter visitors.

In some embodiments, the user may provide the question (s) and the system running the visualization window 200 or the visualization window 200 may provide an action or next set of questions as supported by the inputted dataset to the user. For instance, the user may have typed in "Population?" after clicking on "Cold: Northern City" and the system would then know to ask whether the user would like to know which has a bigger impact on the population of the Northern City during winter, e.g., the winter itself or just the snow, etc.

Figure 3:
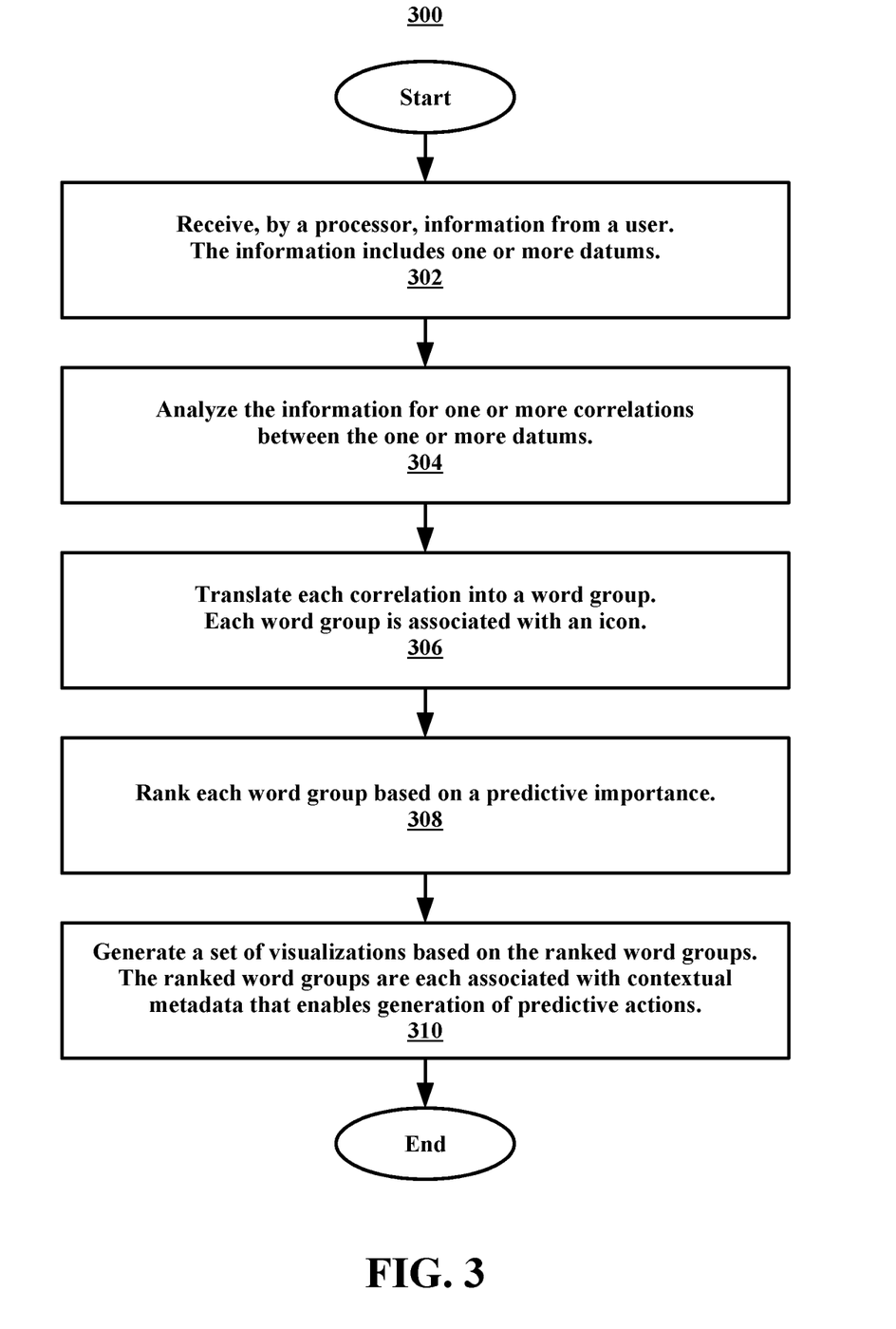
FIG. 3 illustrates a flowchart of an example method for generating a set of visualizations, in accordance with embodiments of the present disclosure.

Referring now to FIG. 3, illustrated is a flowchart of an example method 300 for generating a set of visualizations, in accordance with embodiments of the present disclosure. In some embodiments, the method 300 may be performed by a processor and/or a processor of the system 100 as discussed in regard to FIG. 1.

In some embodiments, the method 300 begins at operation 302, where the processor receives information from a user. The information includes one or more datums. In some embodiments, the information may include images, videos, etc. in addition to the one or more datums. In some embodiments, the method 300 proceeds to operations 304. At operation 304 the processor analyzes the information for one or more correlations (e.g., insights) between the one or more datums.

In some embodiments, the method 300 proceeds to operation 306, where the processor translates (e.g., corresponds, etc.) each correlation into a word group. Each word group is associated with an icon. In some embodiments, the method 300 proceeds to operation 308, where the processor ranks each word group based on a predictive importance (e.g., based on the number of insights need to make the correlation, with the more insights equating to a higher rank and vice-versa).

In some embodiments, the method 300 proceeds to operation 310. At operation 310, the processor generates a set of visualizations based on the ranked word groups. The ranked word groups are each associated with contextual metadata that enables generation of predictive actions. In some embodiments, after operation 310, the method 300 ends.

Figure 4:
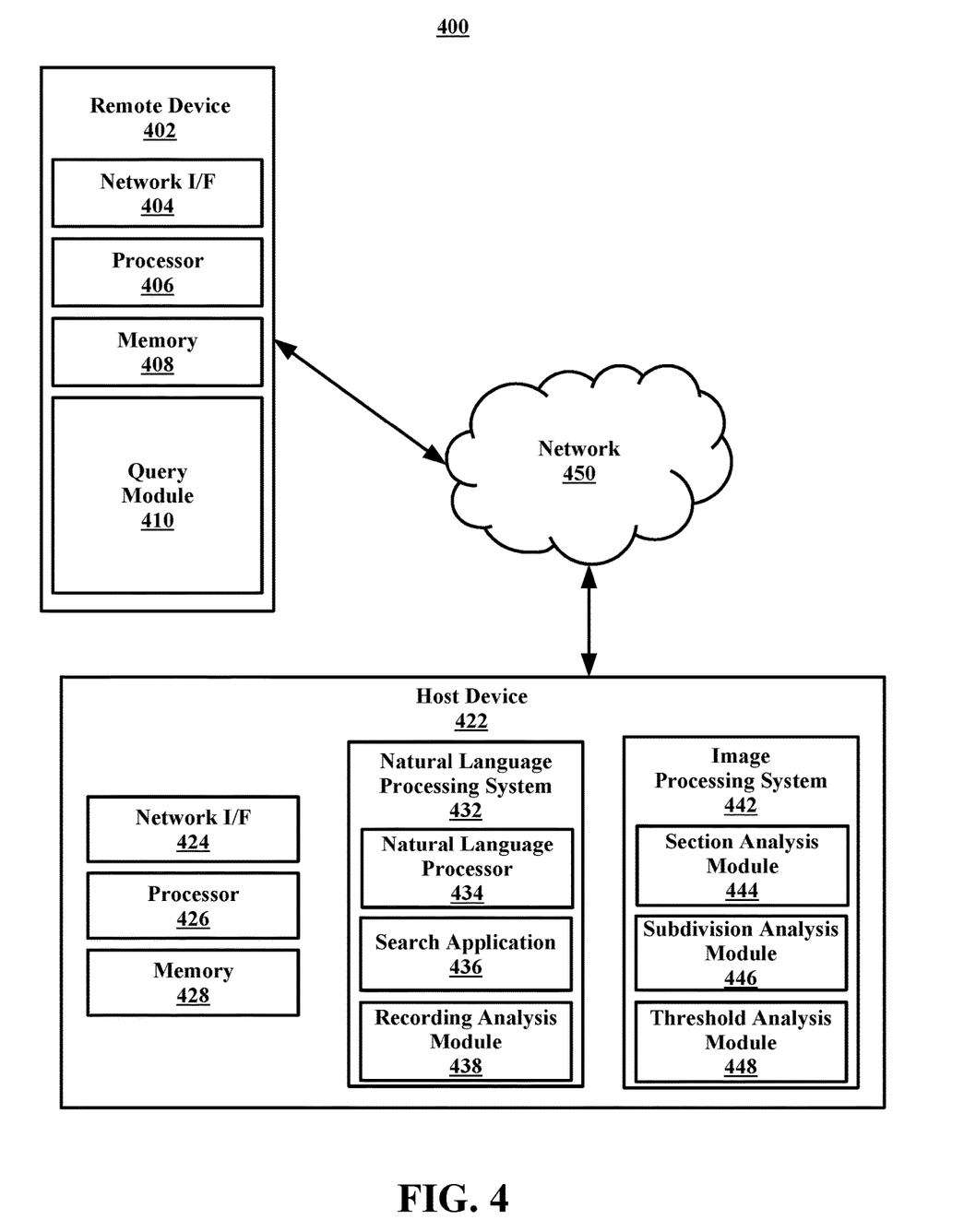
FIG. 4 illustrates a block diagram of an example computing environment in which illustrative embodiments of the present disclosure may be implemented.

As discussed above, aspects of the disclosure may relate to natural language processing. Accordingly, an understanding of the embodiments of the present disclosure may be aided by describing embodiments of natural language processing systems and the environments in which these systems may operate. Turning now to FIG. 4, illustrated is a block diagram of an example computing environment 400 in which illustrative embodiments of the present disclosure may be implemented. In some embodiments, the computing environment 400 may include a remote device 402 and a host device 422.

Consistent with various embodiments, the host device 422 and the remote device 402 may be computer systems. The remote devices 402 and the host device 422 may include one or more processors 406 and 426 and one or more memories 408 and 428, respectively. The remote device 402 and the host device 422 may be configured to communicate with each other through an internal or external network interface 404 and 424. The network interfaces 404 and 424 may be modems or network interface cards. The remote device 402 and/or the host device 422 may be equipped with a display or monitor. Additionally, the remote device 402 and/or the host device 422 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 402 and/or the host device 422 may be servers, desktops, laptops, or hand-held devices.

The remote device 402 the host device 422 may be distant from each other and communicate over a network 450. In some embodiments, the host device 422 may be a central hub from which remote device 402 can establish a communication connection, such as in a client-server networking model. Alternatively, the host device 12 and remote device 402 may be configured in any other suitable networking relationship (e.g., in a peer-to-peer configuration or using any other network topology).

In some embodiments, the network 450 can be implemented using any number of any suitable communications media. For example, the network 450 may be a wide area network (WAN), a local area network (LAN), an internet, or an intranet. In certain embodiments, the remote device 402 and the host device 422 may be local to each other, and communicate via any appropriate local communication medium. For example, the remote device 402 and the host device 422 may communicate using a local area network (LAN), one or more hardwire connections, a wireless link or router, or an intranet. In some embodiments, the remote device 402 and the host device 422 may be communicatively coupled using a combination of one or more networks and/or one or more local connections. For example, the remote device 402 may be hardwired to the host device 422 (e.g., connected with an Ethernet cable) or the remote device 402 may communicate with the host device using the network 450 (e.g., over the Internet).

In some embodiments, the network 450 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 450.

In some embodiments, the remote device 402 may enable a user to input (or may input automatically with or without a user) a query to the host device 422 in order to identify subdivisions of a recording that include a particular subject. For example, the remote device 402 may include a query module 410 and a user interface (UI). The query module 410 may be in the form of a web browser or any other suitable software module, and the UI may be any type of interface (e.g., command line prompts, menu screens, graphical user interfaces). The UI may allow a user to interact with the remote device 402 to input, using the query module 410, a query to the host device 422, which may receive the query.

In some embodiments, the host device 422 may include a natural language processing system 432. The natural language processing system 432 may include a natural language processor 434, a search application 436, and a recording module 438. The natural language processor 434 may include numerous subcomponents, such as a tokenizer, a part-of-speech (POS) tagger, a semantic relationship identifier, and a syntactic relationship identifier. An example natural language processor is discussed in more detail in reference to FIG. 5.

The search application 436 may be implemented using a conventional or other search engine, and may be distributed across multiple computer systems. The search application 436 may be configured to search one or more databases (e.g., repositories) or other computer systems for content that is related to a query submitted by the remote device 402. For example, the search application 436 may be configured to search dictionaries, papers, and/or archived reports to help identify a particular subject related to an inputted dataset. The recording analysis module 438 may be configured to analyze a recording/media associated with identified data. The recording analysis module 438 may include one or more modules or units, and may utilize the search application 436, to perform its functions (e.g., to identify/determine context of data/words, correlations between datum, etc.), as discussed in more detail in reference to FIG. 5.

In some embodiments, the host device 422 may include an image processing system 442. The image processing system 442 may be configured to analyze images associated with media associated with a dataset/word group/etc. to create an image analysis. The image processing system 442 may utilize one or more models, modules, or units to perform its functions (e.g., to analyze the images associated with the dataset/word group/etc. and generate an image analysis). For example, the image processing system 442 may include one or more image processing models that are configured to identify specific images related to a word group (e.g., images of a specific person are analyzed once the specific person is identified as an entity in an inputted dataset). The image processing models may include a section analysis module 444 to analyze single images associated with the dataset and to identify the location of one or more features of the single images (e.g., entity x is identified as being located in New York). As another example, the image processing system 442 may include a subdivision module 446 to group multiple images together identified to have a common feature associated with one or more word groups (e.g., all images including entity x are grouped together and added to the word group that includes entity x). In some embodiments, the image processing models may be implemented as software modules. For example, the image processing system 442 may include a section analysis module and a subdivision analysis module. In some embodiments, a single software module may be configured to analyze the image(s) using the image processing models.

In some embodiments, the image processing system 442 may include a threshold analysis module 448. The threshold analysis module 448 may be configured to compare a verified representation of an identified entity to non-verified representations (e.g., and verify the non-verified representations if a threshold is achieved).

In some embodiments, the host device 422 may have an optical character recognition (OCR) module. The OCR module may be configured to receive a recording sent from the remote device 402 and perform optical character recognition (or a related process) on the recording to convert it into machine-encoded text so that the natural language processing system 432 may perform NLP on the report. For example, the remote device 402 may transmit a video of a medical procedure to the host device 422. The OCR module may convert the video into machine-encoded text, and then the converted video may be sent to the natural language processing system 432 for analysis (e.g., so as to be easily correlated to and/or generate a word-group). In some embodiments, the OCR module may be a subcomponent of the natural language processing system 432. In other embodiments, the OCR module may be a standalone module within the host device 422. In still other embodiments, the OCR module may be located on the remote device 402 and may perform OCR on the recording before the recording is sent to the host device 422.

While FIG. 4 illustrates a computing environment 400 with a single host device 422 and a remote device 402, suitable computing environments for implementing embodiments of this disclosure may include any number of remote devices and host devices. The various models, modules, systems, and components illustrated in FIG. 4 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS, to generate an image analysis.

It is noted that FIG. 4 is intended to depict the representative major components of an exemplary computing environment 400. In some embodiments, however, individual components may have greater or lesser complexity than as represented in FIG. 4, components other than or in addition to those shown in FIG. 4 may be present, and the number, type, and configuration of such components may vary.

Figure 5:
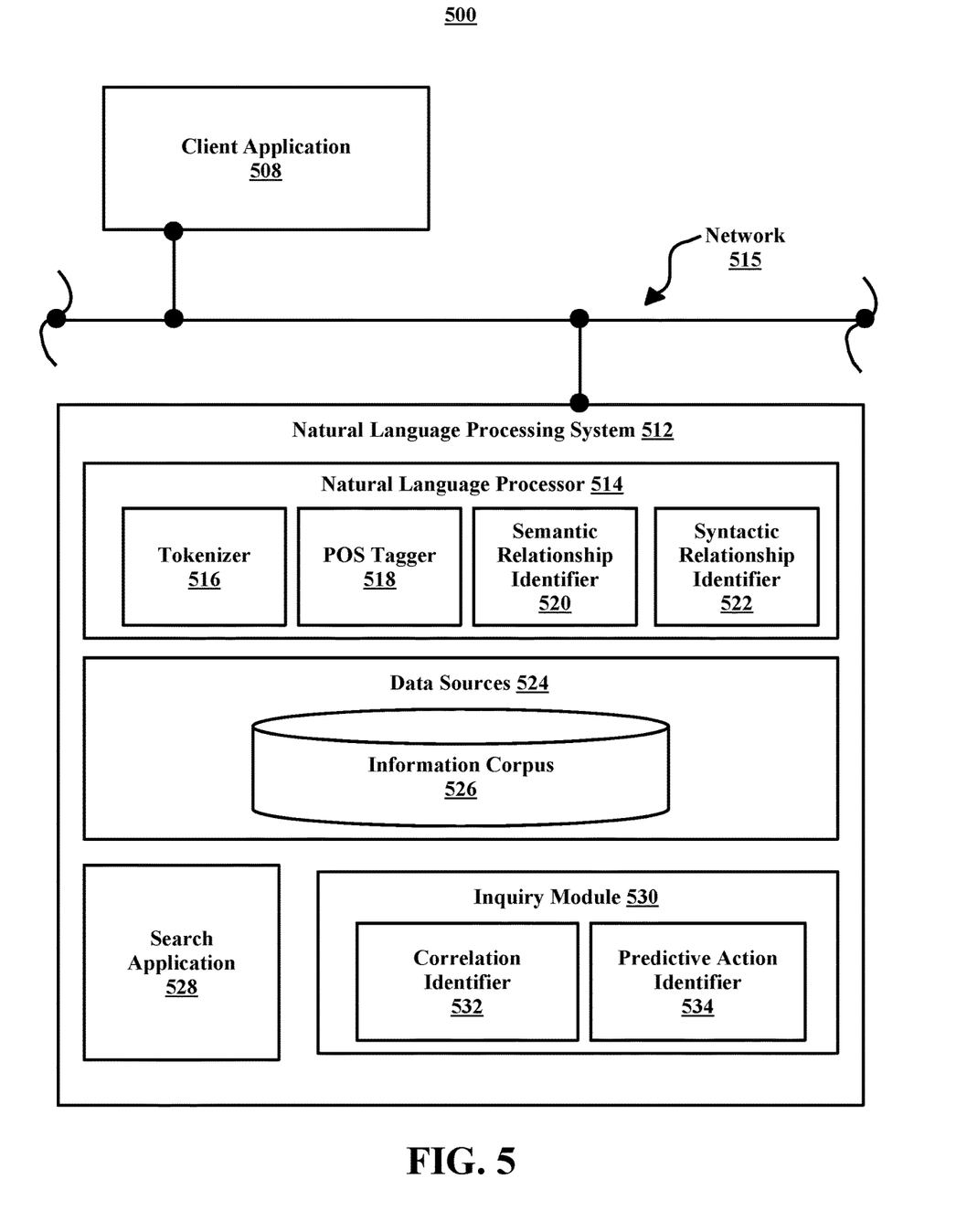
FIG. 5 illustrates a block diagram of an example natural language processing system, in accordance with embodiments of the present disclosure.

Referring now to FIG. 5, shown is a block diagram of an exemplary system architecture 500, including a natural language processing system 512, configured to analyze data to identify a condition and a criterion, in accordance with embodiments of the present disclosure. In some embodiments, a remote device (such as remote device 402 of FIG. 4) may submit a dataset/recording/image/etc. to be analyzed to the natural language processing system 512 that may be housed on a host device (such as host device 422 of FIG. 4). Such a remote device may include a client application 508, which may itself involve one or more entities operable to generate or modify information associated with the dataset that is then dispatched to a natural language processing system 512 via a network 515.

Consistent with various embodiments, the natural language processing system 512 may respond to dataset submissions sent by a client application 508. Specifically, the natural language processing system 512 may analyze a received dataset related to identify a specific data and/or correlations between datum. In some embodiments, the natural language processing system 512 may include a natural language processor 514, data sources 524, a search application 528, and a query module 530. The natural language processor 514 may be a computer module that analyzes the dataset. The natural language processor 514 may perform various methods and techniques for analyzing data(sets) (e.g., syntactic analysis, semantic analysis, etc.). The natural language processor 514 may be configured to recognize and analyze any number of natural languages. In some embodiments, the natural language processor 514 may group one or more sections of a dataset into one or more subdivisions. Further, the natural language processor 514 may include various modules to perform analyses of datasets. These modules may include, but are not limited to, a tokenizer 516, a part-of-speech (POS) tagger 518 (e.g., which may tag each of the one or more sections in which particular data/words/images/representations/etc. are identified), a semantic relationship identifier 520, and a syntactic relationship identifier 522.

In some embodiments, the tokenizer 516 may be a computer module that performs lexical analysis. The tokenizer 516 may convert a sequence of characters (e.g., words, images, sounds, etc.) into a sequence of tokens. A token may be a string of characters included in a dataset and categorized as a meaningful symbol (e.g., an icon). Further, in some embodiments, the tokenizer 516 may identify word boundaries in a dataset and break any text within the dataset into their component text elements, such as individual words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up a word in a dataset to correspond to a particular part of speech. The POS tagger 518 may read a passage or other text in natural language and assign a part of speech to each word or other token. The POS tagger 518 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed datasets (e.g., the content of one dataset may shed light on the meaning of one or more subjects in another dataset). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a recording with part of speech categories. In some embodiments, the POS tagger 518 may tag tokens or words of a recording to be parsed by the natural language processing system 512.

In some embodiments, the semantic relationship identifier 520 may be a computer module that may be configured to identify semantic relationships of recognized subjects (e.g., words, phrases, images, etc.) in a dataset. In some embodiments, the semantic relationship identifier 520 may determine functional dependencies between entities and other semantic relationships.

Consistent with various embodiments, the syntactic relationship identifier 522 may be a computer module that may be configured to identify syntactic relationships in a dataset composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may group sections of a dataset into subdivisions and generate corresponding data structures for one or more subdivisions of the dataset. For example, in response to receiving a dataset at the natural language processing system 512, the natural language processor 514 may output subdivisions of the dataset as data structures. In some embodiments, a subdivision may be represented in the form of a graph structure. To generate the subdivision, the natural language processor 514 may trigger computer modules 516-522.

In some embodiments, the output of natural language processor 514 may be used by search application 528 to perform a search of a set of (i.e., one or more) corpora to retrieve one or more subdivision including a particular subject associated with a dataset and/or a word in the dataset and send the output to an image processing system and to a comparator. As used herein, a corpus may refer to one or more data sources, such as the data sources 524 of FIG. 5. In some embodiments, the data sources 524 may include video libraries, data warehouses, information corpora, data models, and document repositories. In some embodiments, the data sources 524 may include an information corpus 526. The information corpus 526 may enable data storage and retrieval. In some embodiments, the information corpus 526 may be a subject repository that houses a standardized, consistent, clean, and integrated list of images and dialogue. For example, the information corpus 526 may include the dialogue of nature documentaries, etc. The data may be sourced from various operational systems. Data stored in the information corpus 526 may be structured in a way to specifically address reporting and analytic requirements. In some embodiments, the information corpus 526 may be a relational database.

In some embodiments, the inquiry module 530 may be a computer module that identifies correlations between words and/or word groups and generates inquires to be asked by a user and/or automatically answered or inferred by a system, as based on an inputted dataset. In some embodiments, the inquiry module 530 may include a correlation identifier 532 and a predictive action identifier 534. When a dataset is received by the natural language processing system 512, the inquiry module 530 may be configured to analyze the dataset using natural language processing to identify one or more correlations. The inquiry module 530 may first identity one or more datums/words in the dataset using the natural language processor 514 and related subcomponents 516-522. After identifying the one or more datums, the correlation identifier 532 may identify one or more correlations/associations between the one or more datums. Once a correlation is identified, the correlation identifier 532 may be configured to transmit the correlations to an image processing system (shown in FIG. 4) and/or to a comparator (shown in FIG. 4).

After identifying correlations of the dataset using the correlation identifier 532, the inquiry module 530 may utilize the predictive action identifier 534 to identify actions/questions to be performed by a system. After identifying actions/questions based on the dataset, the predictive action identifier 534 may be configured to transmit the criterion to an image processing system (shown in FIG. 4) and/or to a comparator (shown in FIG. 4) in order to identify/generate further actions/questions to be performed by the system.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
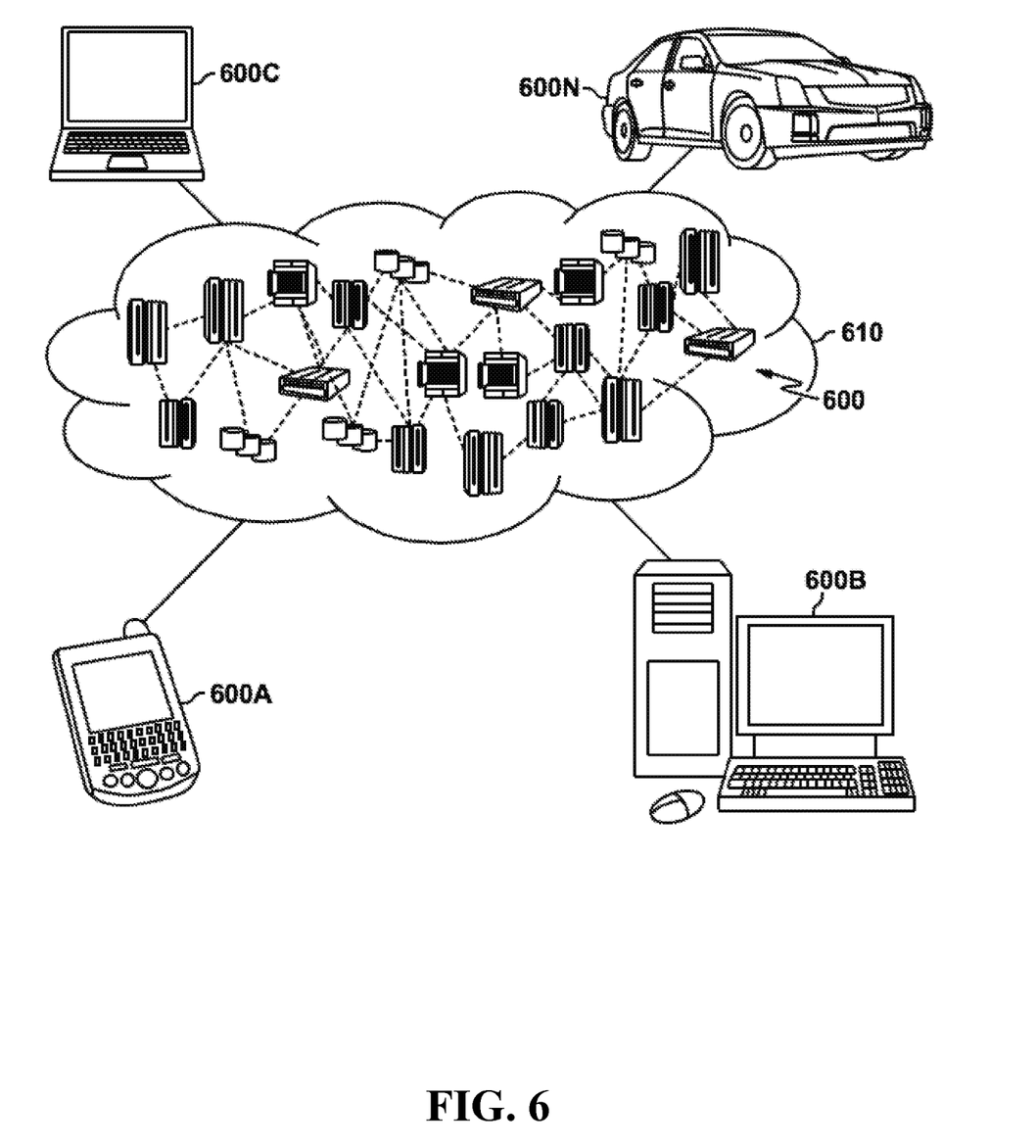
FIG. 6 depicts a cloud computing environment, in accordance with embodiments of the present disclosure.

Referring now to FIG. 6, illustrative cloud computing environment 610 is depicted. As shown, cloud computing environment 610 includes one or more cloud computing nodes 600 with which local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof.

This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
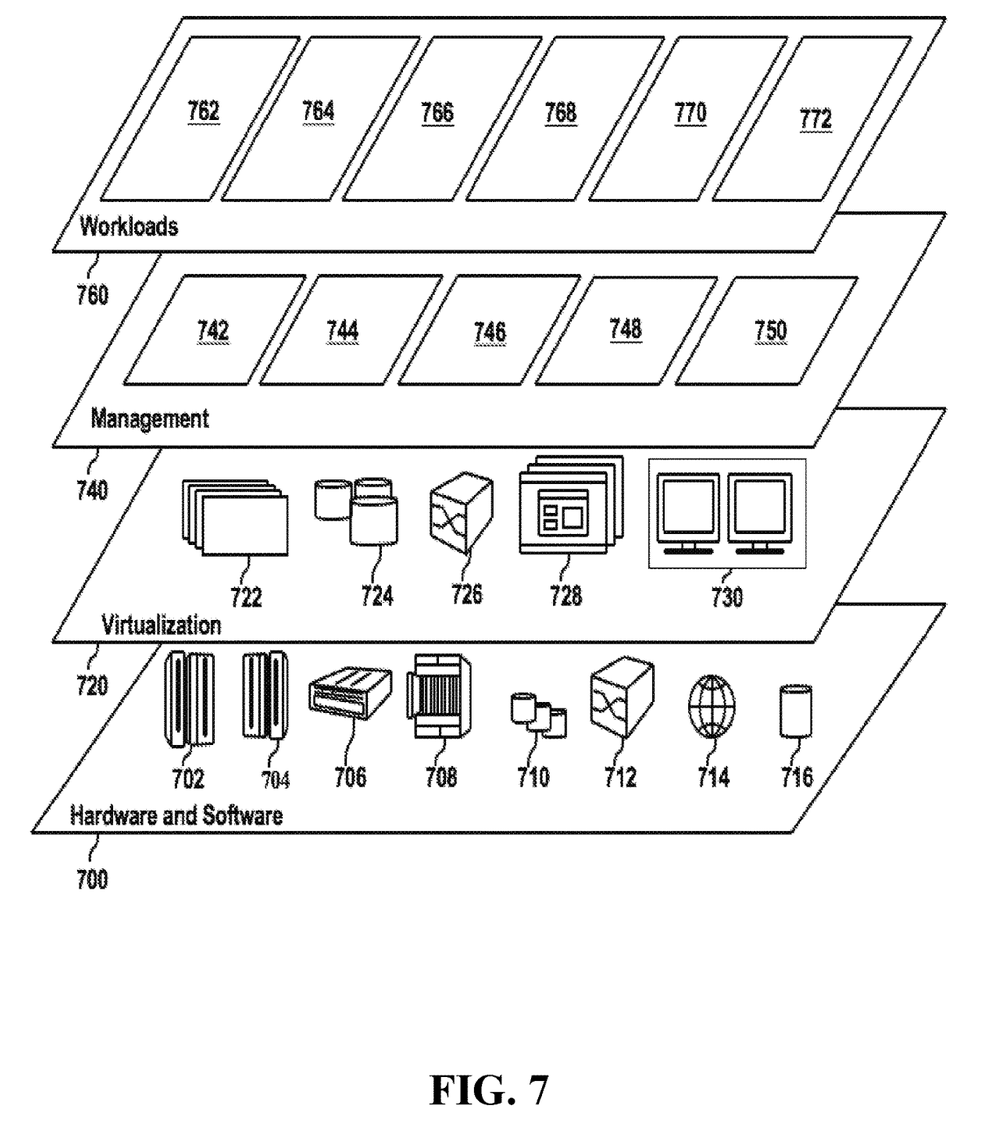
FIG. 7 depicts abstraction model layers, in accordance with embodiments of the present disclosure.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and automatic visualization generating 772.

Figure 8:
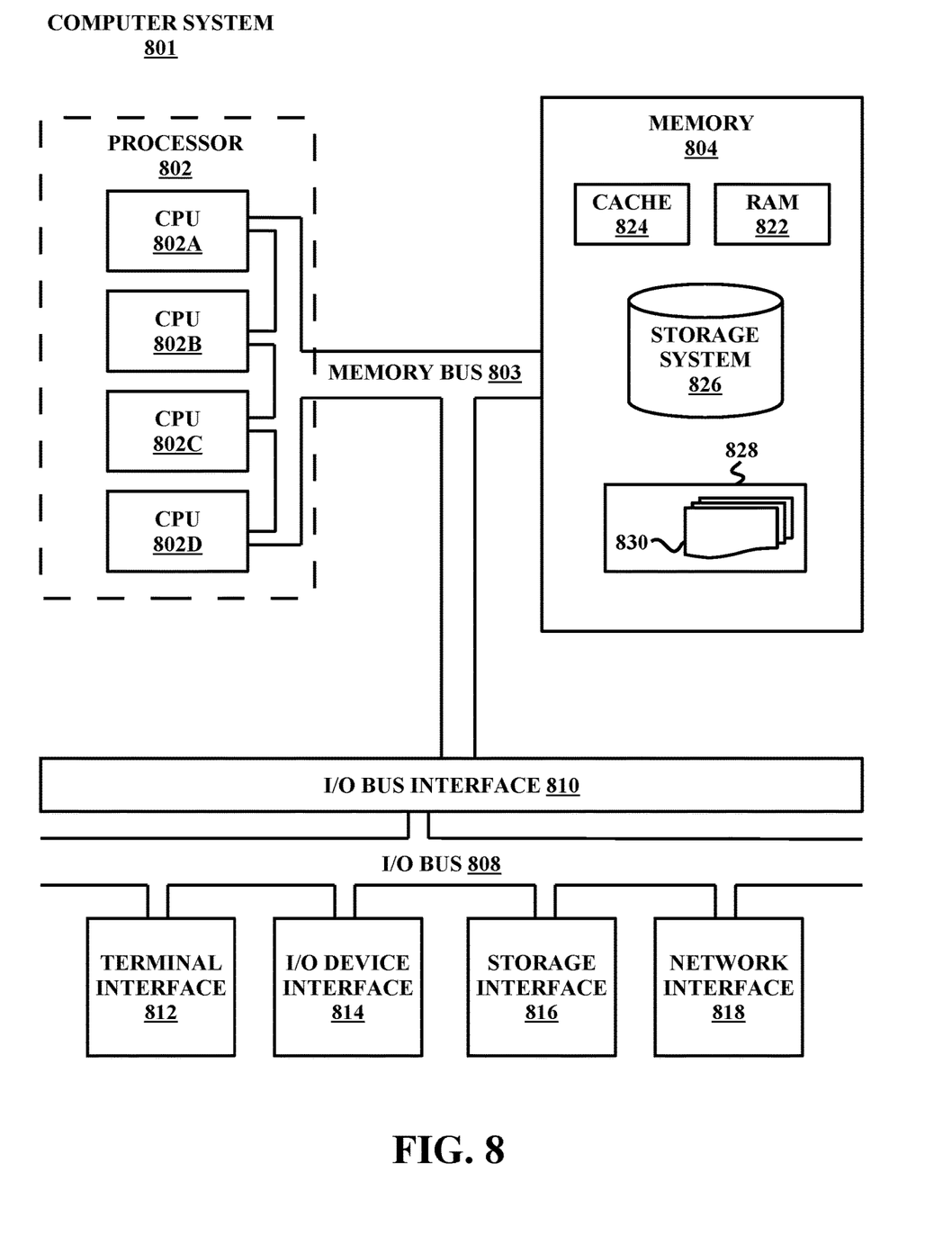
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   receiving, by a processor, information from a user, wherein the information includes one or more datums;
   analyzing the information for one or more correlations between the one or more datums;
   translating each correlation into a word group, wherein each word group is associated with an icon, and wherein translating each correlation into the respective word groups comprises:
      interpreting, based on natural language processing techniques, a context of each of the one or more datums, wherein the context of each of the one or more datums is based on a subject associated with the one or more datums,
      combining each of the one or more datums within a context threshold into one or more of the respective word groups, wherein the context threshold is based on the one or more datums historically identified together, and
      tagging each of the respective word groups with an indication of the context, wherein the indication is the icon;
   ranking each word group based on a predictive importance; and
   generating a set of visualizations based on the ranked word groups, wherein the ranked word groups are each associated with contextual metadata that enables generation of predictive actions.

2. The method of claim 1, wherein the set of visualizations is a word cloud, wherein the word cloud includes a display of each of the word groups, and wherein the display of each of the word groups includes a user interactive link to a respective predictive action embedded in each of the displayed word groups.

3. The method of claim 2, further comprising:
   identifying that the user has selected a specific user interactive link that is associated with specific contextual metadata;
   generating a set of predictive actions associated with the specific contextual metadata;
   displaying the set of predictive actions to the user.

4. The method of claim 3, wherein the set of predictive actions include inquiry metadata that enables generation of an inquiry, and wherein the method further comprises:
   identifying that the user has selected a specific inquiry metadata;

generating an inquiry associated with the inquiry metadata; and displaying the inquiry to the user.

5. The method of claim 1, wherein ranking each word group based on the predictive importance comprises:

determining a degree of relevance for each word group, wherein the degree of relevance is based on an ease of defining each correlation.

6. The method of claim 5, wherein determining the degree of relevance for each word group comprises:

accessing a database, wherein the database includes historic information that indicates previously identified correlations between the one or more datums;

identifying that a specific correlation is not in the database; and ranking the word group associated with the specific correlation above the other word groups.

7. A system comprising:

a memory; and a processor in communication with the memory, the processor executing instructions contained within the memory in order to perform operations comprising:

receiving information from a user, wherein the information includes one or more datums;

analyzing the information for one or more correlations between the one or more datums;

translating each correlation into a word group, wherein each word group is associated with an icon, and wherein translating each correlation into the respective word groups comprises:

interpreting, based on natural language processing techniques, a context of each of the one or more datums, wherein the context of each of the one or more datums is based on a subject associated with the one or more datums, combining each of the one or more datums within a context threshold into one or more of the respective word groups, wherein the context threshold is based on the one or more datums historically identified together, and tagging each of the respective word groups with an indication of the context, wherein the indication is the icon;

ranking each word group based on a predictive importance; and generating a set of visualizations based on the ranked word groups, wherein the ranked word groups are each associated with contextual metadata that enables generation of predictive actions.

8. The system of claim 7, wherein the set of visualizations is a word cloud, wherein the word cloud includes a display of each of the word groups, and wherein the display of each of the word groups includes a user interactive link to a respective predictive action embedded in each of the displayed word groups.

9. The system of claim 8, wherein the operations further comprise:

identifying that the user has selected a specific user interactive link that is associated with specific contextual metadata;

generating a set of predictive actions associated with the specific contextual metadata;

displaying the set of predictive actions to the user.

10. The system of claim 9, wherein the set of predictive actions include inquiry metadata that enables generation of an inquiry, and wherein the operations further comprise:

identifying that the user has selected a specific inquiry metadata;

generating an inquiry associated with the inquiry metadata; and displaying the inquiry to the user.

11. The system of claim 7, wherein ranking each word group based on the predictive importance comprises:

determining a degree of relevance for each word group, wherein the degree of relevance is based on an ease of defining each correlation.

12. The system of claim 11, wherein determining the degree of relevance for each word group comprises:

accessing a database, wherein the database includes historic information that indicates previously identified correlations between the one or more datums;

identifying that a specific correlation is not in the database; and ranking the word group associated with the specific correlation above the other word groups.

13. A computer program product comprising a computer readable storage medium having program instructions embodied therewith, the program instructions executable by a processor to cause the processor to perform a method, the method comprising:

receiving information from a user, wherein the information includes one or more datums;

analyzing the information for one or more correlations between the one or more datums;

translating each correlation into a word group, wherein each word group is associated with an icon, and wherein translating each correlation into the respective word groups comprises:

interpreting, based on natural language processing techniques, a context of each of the one or more datums, wherein the context of each of the one or more datums is based on a subject associated with the one or more datums, combining each of the one or more datums within a context threshold into one or more of the respective word groups, wherein the context threshold is based on the one or more datums historically identified together, and tagging each of the respective word groups with an indication of the context, wherein the indication is the icon;

ranking each word group based on a predictive importance; and generating a set of visualizations based on the ranked word groups, wherein the ranked word groups are each associated with contextual metadata that enables generation of predictive actions.

14. The computer program product of claim 13, wherein the set of visualizations is a word cloud, wherein the word cloud includes a display of each of the word groups, and wherein the display of each of the word groups includes a user interactive link to a respective predictive action embedded in each of the displayed word groups.

15. The computer program product of claim 14, wherein the method further comprises:

identifying that the user has selected a specific user interactive link that is associated with specific contextual metadata;

generating a set of predictive actions associated with the specific contextual metadata;

displaying the set of predictive actions to the user.

16. The computer program product of claim 15, wherein the set of predictive actions include inquiry metadata that enables generation of an inquiry, and wherein the method further comprises:
- identifying that the user has selected a specific inquiry metadata;
- generating an inquiry associated with the inquiry metadata; and
- displaying the inquiry to the user.

17. The computer program product of claim 15, wherein ranking each word group based on the predictive importance comprises:
- determining a degree of relevance for each word group, wherein the degree of relevance is based on an ease of defining each correlation, and wherein determining the degree of relevance for each word group includes:
  - accessing a database, wherein the database includes historic information that indicates previously identified correlations between the one or more datums;
  - identifying that a specific correlation is not in the database; and
  - ranking the word group associated with the specific correlation above the other word groups.

* * * * *